United States Patent [19]

Hwang et al.

[11] Patent Number: 5,430,096

[45] Date of Patent: Jul. 4, 1995

[54] AQUEOUS SIZE FOR FIBER REINFORCED HIGH TEMPERATURE COMPOSITES

[75] Inventors: Sang-Hak Hwang, Wilmington, Del.; Thomas J. Proffitt, Jr., Kinston, N.C.

[73] Assignee: E. I. Du Pont de Nemours and Company, Wilmington, Del.

[21] Appl. No.: 234,191

[22] Filed: Apr. 28, 1994

Related U.S. Application Data

[62] Division of Ser. No. 989,483, Nov. 12, 1992, abandoned.

[51] Int. Cl.[6] .............................................. C08L 77/00
[52] U.S. Cl. ................................... 524/602; 524/87; 524/99; 524/104; 524/600; 524/601; 523/205; 428/367; 428/375; 428/378; 428/473.5
[58] Field of Search ................. 524/104, 234, 323, 87, 524/99, 104, 600, 601, 378; 528/182, 89; 428/367, 378, 428, 375, 473.5; 523/2.5

[56] References Cited

U.S. PATENT DOCUMENTS 4,923,752  5/1990  Cornelia ............................. 428/367

FOREIGN PATENT DOCUMENTS 2646179  4/1989  France .
3-7764   1/1991  Japan .
3-9953   1/1991  Japan .

*Primary Examiner*—Patrick J. Ryan
*Assistant Examiner*—Rich Weisbeiger

[57] ABSTRACT

Stable aqueous size of ammonia-and/or amine-neutralized poly(amide-acid) of certain aromatic dianhydrides with certain aromatic diamines.

2 Claims, No Drawings

AQUEOUS SIZE FOR FIBER REINFORCED HIGH TEMPERATURE COMPOSITES

This is a division of application Ser. No. 07/989,483, filed Nov. 12, 1992, now abandoned.

BACKGROUND OF THE INVENTION

The use of carbon fiber for high temperature composite applications is of growing interest. Greater use of carbon fiber yarns is dependent, at least in part, on achieving improvements in handleability during yarn processing such as weaving and yarn delivery during take-off from the package, and in the production of composites with good resin dominated mechanical properties. The use of agents which might permit attainment of these objectives is limited to those which can withstand high temperatures encountered in production and use of parts from the composites. Thus, standard epoxy sizes, while providing yarns with excellent handleability and processibility, are unacceptable since they are unstable at the temperatures required in the cure cycles. Attempts to use these sizes would lead to degradation at the fiber-resin matrix interface where good adhesion is vital to obtaining the desired mechanical properties.

U.S. Pat. No. 4,923,752 to Cornelia provides a useful size for carbon fiber to be used in high temperature composites. The size is constituted by a fluorinated poly(amide-acid) in a mixture of defined proportions of an aprotic solvent and an alcohol. It is difficult to control the size concentration in an application bath because the solvent alcohol evaporates easily. As a result, the yarn size pickup is hard to control. Also, the size requires that certain precautionary measures be taken in handling both from the standpoint of safety and with regard to environmental considerations. The present invention provides a novel size composition that to a great extent obviates the need for such measures.

SUMMARY OF THE INVENTION

This invention provides a novel aqueous sizing composition of good stability comprising as a first component, at least 0.1% by weight of a poly(amide-acid) formed from a dianhydride selected from the group consisting of 2,2-bis(3',4'-dicarboxyphenyl hexafluoropropane dianhydride, pyromellitic dianhydride, biphenyl dianhydride, oxydiphthalic dianhydride and benzophenone dianhydride and an aromatic diamine selected from the group consisting of paraphenylene diamine, metaphenylene diamine, 4,4'-oxydianiline and 3,4'-oxydianiline, said poly(amide-acid) having been neutralized with ammonia and/or amines, as a second component, an aprotic solvent selected from the group consisting of N-methylpyrrolidone, dimethylacetamide, diglyme, dimethylformamide, and dimethylsulfoxide, said solvent being present in an amount by weight at least half that of the poly(amide-acid) and as a third component, at least 85% by weight of water. Also provided by the invention is carbon fiber coated with the novel size.

DETAILED DESCRIPTION OF THE INVENTION

The present invention offers a novel size for fibers commonly employed as reinforcement in composites wherein the matrix polymer requires high temperature curing. The size must be capable of forming a continuous uniform coating on the fiber to provide improved handleability of the yarn during processing and to assure uniform contact with the matrix polymer. At the same time it must resist high temperature degradation during formation of the composite which could interfere with adhesion to the matrix polymer. During and after curing, the size should be completely miscible with the matrix polymer, particularly the aromatic polymer with high glass transition temperature. The size of the invention accomplishes these objectives and in addition, is environment-friendly.

It is essential that the poly(amide-acid) component of the size be one that can withstand the high curing temperatures that are employed in production of the composite structure. Suitable poly(amide-acid) are those produced by reaction of aromatic diamines of the group, paraphenylene diamine, metaphenylene diamine, 4,4'-oxydianiline and 3,4'-oxydianiline, with aromatic dianhydrides of the group 2,2-bis(3',4'-dicarboxyphenyl) hexafluoropropane dianhydride, pyromellitic dianhydride, biphenyl dianhydride, oxydiphthalic dianhydride and benzophenone dianhydride. A proper combination of these dianhydrides and diamines give aromatic polyimide interfacial coatings, when cured, having glass transition temperatures between ~270° C. and 400° C., greatly enhancing the temperatures at which the composite structures may be used. The molar ratio of dianhydride to diamine reactant may range from 0.8 to 1.2. A particularly preferred poly(amide-acid) for use in the present invention is that prepared by reaction between 2,2-bis(3', 4'-dicarboxyphenyl) hexafluoropropane dianhydride and a 95:5 mixture of para- and meta-phenylene diamine.

The poly(amide-acid) is used in the size as the salt neutralized with ammonia and/or amines. Aliphatic, particularly lower alkyl (1-4 c atoms) and lower alkanol (1-4 c atoms) primary, secondary and tertiary amines are useful. Conveniently, in the production of the size, ammonia and/or amines are added to the poly(amide-acid) precursor in an aqueous medium. An excess of ammonia and/or amines are normally employed to assure complete neutralization and partial depolymerization/hydrolysis to a molecular size which is micro-emulsified/solubilized in water by formation of its ammonium and/or amine salt.

A further component of the size composition is an aprotic solvent selected from the group consisting of N-methylpyrrolidone, dimethylacetamide, diglyme, dimethylformamide, and dimethylsulfoxide. This component is present in the size in small amounts, equal to about half the weight of the poly(amide-acid) or in greater amounts. Its function is to achieve with salt-forming ammonia and/or amines micro-emulsification or solubilization of the size in water. It also provides stability to the size composition and inhibits precipitation of size components over time periods involved in shipment and storage. It also helps to make the size coating on the fiber more uniform by lowering the surface energy of the aqueous size. In general, greater amounts of aprotic solvent allow use of lesser amounts of ammonia or amine.

The final component of the size composition is water in amounts of at least 85% by weight. Although the poly(amide-acid) molecules hydrolyze somewhat in the size composition, they repolymerize reversibly with heating without any adverse effect. When the fiber coated with size is heated to about 170° C., water and ammonia evaporate off and the molecular weight of the polymer increases. Any residual aprotic solvent tends to plasticize the coating and enhances compatibility with the matrix polymer, particularly with aromatic polyimide matrices. Via plasticization, it also helps the size on the filaments to mix with the matrix polymer and the molecular weight to buildup during drying and curing.

It is expected that the novel size will be used mostly on carbon fiber, however, its use as a size for other high temperature fiber reinforcement is also contemplated.

For shipment, one is likely to use a "masterbatch" size composition which would be diluted with water at point of use to the size composition desired for application to the fiber substrate.

The following examples are illustrative of the present invention and are not to be construed as limiting.

EXAMPLE 1

To a 2000 ml vessel was added 1031.12 g of N-methyl pyrrolidone (NMP) and the solvent was blanketed with nitrogen. To this were added 82.18 g of paraphenylene diamine and 4.33 g of meta-phenylene diamine (total diamine 0.80 mole). This mixture was stirred to achieve a clear solution (ca. 20 minutes) and then there was added 355 40 g (0 80 mole) of 2,2-bis(3',4'-dicarboxyphenyl) hexafluoropropane dianhydride. The reaction was stirred well overnight at about 68°–100° C. under a blanket of dry nitrogen, and the viscous solution was cooled to room temperature. Thus, a 30 wt. % poly(amide-acid) solution in NMP was produced.

To a 5000 ml vessel was added 2386.4 g of water under a dry nitrogen blanketing. To this were added 1284.40 g of the above 30 wt. % poly(amide-acid) solution in NMP and 150 cc of ammonium hydroxide (29 wt. % ammonia). The mixture was stirred overnight and a micro-emulsification in water of poly(amide-acid) was achieved. Thus was made a 10% by weight aqueous sizing "master batch". The pH was 9.25. The composition of this "master batch" in wt. % is: 10.0 poly(amide-acid), 23.3 NMP, 1.4 ammonia, and 65.3 water. A desired concentration in a bath for application was achieved by merely diluting the "master batch" with water.

The poly(amide-acid) size dispersed in water hydrolyzes, but its number-average molecular weights at 10 and 1 wt. % solids are still fairly high, 4500 and 2700, respectively. When the 1% by weight aqueous size was heated to 170° C. (which is the drying temperature), and to 350° C. (which is the matrix curing temperature), the number-average molecular weights reversibly increased to 10,900 and 13,400, respectively, without any side effects of hydrolysis.

After dilution (1.0, 1.6, and 2.2% by weight concentrations), the aqueous size was applied, via a size bath with an immersed rotating roll, to 10 ends of unsized carbon fiber yarns (Hercules AS4-3K) running in parallel at 5 ft/min. for 80 minutes (400 ft. total). The light scattering of a 1.0% by weight aqueous size showed an excellent micro-emulsification and solubilization, and that the colloids had a size distribution between ~50 and ~800 nm with a peak of ~500 nm. The % size pickup correlated well with the size concentration of the bath. The aqueous size in the bath was very uniform and stable in that the end-to-end (10 ends) uniformity was excellent as was the start-to-end % size uniformity of the yarns. The coefficients of variation were less than 8.5, which is less than half of those of commercial epoxy sizes. The size spontaneously wicked into the fiber bundles and coated individual filaments well, producing cohesive fiber bundles and allowing only a little fuzz to show up on them. The size did not cause a stickiness problem on the rolls which would cause filament wraps and process discontinuity.

When dried in hot air at ~170° C., the yarn bundle showed a uniform coating, and had acceptable levels of dynamic frictional characteristics and various stiffnesses depending on the size pick-up, all similar to those of Hercules AS4G-3K sized with a commercial epoxy and of Celion ® G30-500-3K yarn sized with an organic solvent (NMP/ethanol) based fluorinated poly(amide-acid) size (U.S. Pat. No. 4,923,752).

The sized yarns have good cohesion, effectively trapped any broken filaments in the starting yarns and show few "thornbushes" that would lead to abrasion of warping yarns during weaving. The yarns are very pliable and the loops formed can be pulled out easily without forming kinks.

EXAMPLE 2

To a 2000 ml vessel was added 441.91 g of N-methyl pyrrolidone (NMP) and the solvent was blanketed with dry nitrogen. To this were added 82.18 g of para-phenylene diamine and 4.33 g of meta-phenylene diamine (total diamine 0.80 moles). This mixture was stirred at 40° C. to achieve a clear solution (ca. 20 minutes) and then there was added 355.40 g (0.80 moles) of 2,2-bis(3',4'-dicarboxyphenyl) hexafluoropropane dianhydride. The reaction was stirred well overnight at about 73°–100° C. under a blanket of dry nitrogen, and the viscous solution was cooled to room temperature. Thus, a 50 wt. % poly(amide-acid) solution in NMP was produced.

To a 5000 ml vessel was added 2386.4 g of water under a nitrogen blanketing. To this were added 760 g of the above 50 wt. % poly(amide-acid) solution in NMP and 400 cc of ammonium hydroxide (29 wt. % ammonia). The mixture was stirred overnight and micro-emulsification in water of poly(amide-acid) was achieved. Thus was made a 10% by weight aqueous sizing "master batch". The pH was 10.19. The composition of this "master batch" in wt. % is: 10.23 poly(amide-acid), 10.23 NMP, 2.84 ammonia, and 76.70 water. A desired concentration in a bath for application was achieved by merely diluting the "master batch" with water.

As in Example 1, the diluted aqueous sizes were applied to carbon fiber yarns. Similarly, excellent results were obtained in the sizing process and the quality of the sized carbon yarns.

EXAMPLE 3

A dimethyl acetamide solution of 22.10 wt. % poly(amide acid) that is made from pyromellitic dianhydride and 4,4'-oxydianiline with a stoichiometric ratio of 0.995 to 1.000 was used as precursor. It is diluted with deionized water with the help of ammonia to make a clear and stable 1 wt. % aqueous size. Its composition in wt. % is: 1.1 polymer size, 3.9 DMAc, 0.2 ammonia, and 94.8 water.

This 1 wt. % aqueous size spontaneously wicked to unsized AS-4 3K carbon fibers and uniformly coated them. The characteristics of the sized yarns were similar to those in Example 1.

EXAMPLE 4

To a 250 ml vessel were added, under nitrogen blanketing, 36 g of water and 4 g of a 10 wt. % solution in N-methylpyrrolidone (NMP) of a poly(amide-acid)

formed from a stoichiometric mixture of 2,2-bis(3',4'-dicarboxyphenyl) hexafluoropropane dianhydride and a 95:5 mixture of para- and meta-phenylene diamines. To this was added 0.2 g of triethylamine. The mixture was stirred for about four hours and a clear and stable micro-emulsification in water of poly(amide-acid) was achieved. Its composition in wt. % is: 1.00 polymer size, 8.96 NMP, 0.50 triethylamine, and 89.55 water.

This 1 wt. % aqueous size wicked to unsized AS-4 3K carbon fibers and uniformly coated them. The characteristics of the sized yarns were similar to those in Example 1.

We claim:

1. A stable aqueous size composition for fiber used to reinforce high temperature composites comprising as a first component, at least 0.1% by weight of a poly(amide-acid) formed from a dianhydride selected from the group consisting of 2,2-bis(3',4'-dicarboxyphenyl hexafluoropropane dianhydride, pyromellitic dianhydride, biphenyl dianhydride, oxydiphthalic dianhydride and benzophenone dianydride and an aromatic diamine selected from the group consisting of paraphenylene diamine, metaphenylene diamine, 4,4'-oxydianiline and 3,4'-oxydianiline, said poly(amide-acid) having been neutralized with ammonia and/or amines where in the amines are selected from a group consisting of lower alkyl amines of 1 to 4 carbons and lower alkanol amines of 1 to 4 carbons of primary, secondary and tetiary structure, as a second component, an aprotic solvent selected from the group consisting of N-methylpyrrolidone, dimethylacetamide, diglyme, dimethylformamide, and dimethylsulfoxide, said solvent being present in an amount by weight at least half that of the poly(amide-acid) and as a third component, at least 85% by weight of water.

2. A sizing composition according to claim 1 wherein the molar ratio of dianhydride to diamine is 0.8 to 1.2.

* * * * *